F. Kirst,
Lathe Chuck,
N°. 43,512. Patented July 12, 1864.
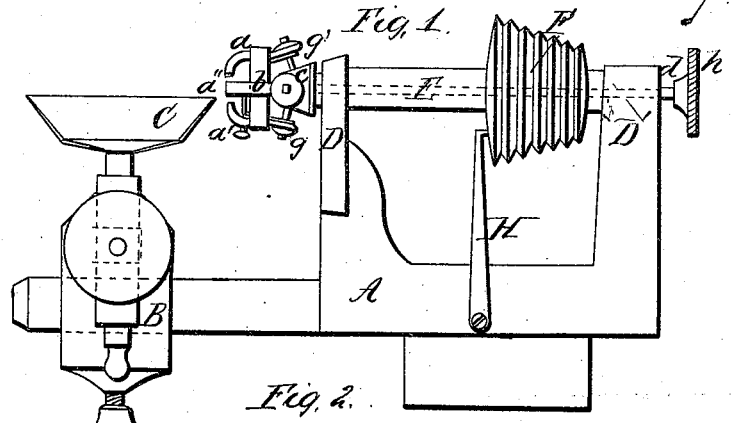
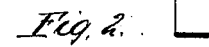
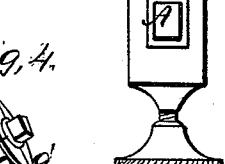
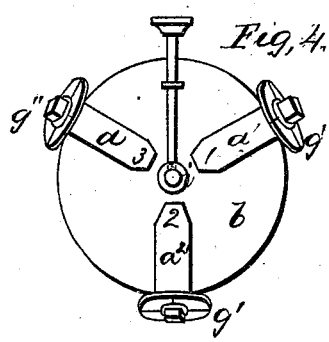
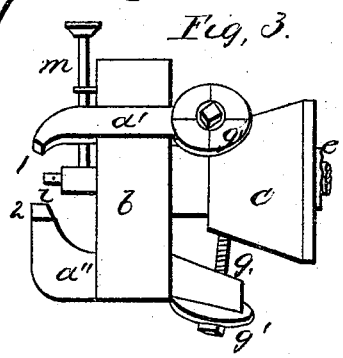
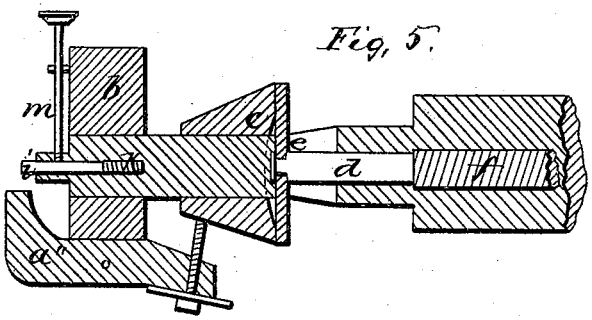
Witnesses;
Milton Bradley
J. B. Gardner
Inventor;
Folbert Kirst

UNITED STATES PATENT OFFICE.

FOLBERT KIRST, OF WESTFIELD, MASSACHUSETTS.

IMPROVEMENT IN TURNING-LATHES.

Specification forming part of Letters Patent No. 43,512, dated July 12, 1864; antedated July 6, 1864.

*To all whom it may concern:*

Be it known that I, FOLBERT KIRST, of Westfield, in the county of Hampden and Commonwealth of Massachusetts, have invented a new and Improved Chuck for Turning-Lathes; and I do hereby declare that the following is a full, clear, and exact description of the same, reference being had to the accompanying drawings, making a part of this specification—

The object of my invention is to produce a chuck for a lathe which shall be capable of holding a variety of work, and at the same time hold each piece perfectly central. Some parts are more especially designed for watch-work, and generally the whole construction is more adapted for small work than for large, yet a large chuck constructed on the same principle would be very useful for many kinds of work.

In the drawings, Figure 1 is a side view of a lathe with my invention attached. Fig. 2 is an end view of the same. Fig. 3 is a side view of the chuck, drawn to a larger scale; Fig. 4, an end view, and Fig. 5 a longitudinal section, of the same.

Like letters of reference indicate corresponding parts in each of the several figures.

A is the frame or support.

B is the support for rest C.

D D' are bearings for the spindle E.

F is the driving-pulley on E.

$a$ $a'$ $a''$ are three jaws pivoted to the head $b$ of the chuck.

$b$ is made fast to the end of spindle E.

$c$ is a conical collar fitting perfectly to E and turned exactly concentric with the same.

$d$ is a rod running through the spindle E and attached to the collar $c$ at $e$.

$f$ is a screw on $d$, fitting in a corresponding nut on the inside of spindle E.

$g$ $g'$ $g''$ are screws in the back ends of $a$ $a'$ $a''$. These screws are adjusted so that when the heads are screwed down onto the jaws $a$ $a'$ $a''$ and the points resting on the collar $c$ the points of the jaws at 1 2 3 will hold a piece exactly concentric with the spindle. Now, the circumference of each of the large screw-heads is divided into four equal parts, and a corresponding mark made on the top of each jaw where it comes in contact with the circumference of the head. Thus, if these screws are turned out it allows the back ends of the jaws $a$ $a'$ $a''$ to come nearer to the conical collar $c$, and consequently allows the points of the jaws at 1 2 3 to open farther, and therefore receive a larger piece of work; but if one screw should be turned out more than another the jaws would not hold the work central. Therefore the heads are provided with the marks or points before mentioned, so that it can be seen when each screw has been turned just one, two, or three quarters. Of course, finer divisions could be made, if desirable; but the sliding collar furnishes the means for all nicer variations.

$h$ is a head on the end of the rod $d$, by which it may be turned.

$i$ is a small pin or center fitting into a hole drilled exactly in the center of the spindle E.

K is a spiral spring behind the center $i$. The front end of $i$ is countersunk, so as to form a center to receive the point or center of any small arbor or similar article to be turned.

$m$ is a screw to hold the center $i$ in any given place.

H is a catch or stop, which hooks into the pulley F to confine the spindle while turning the rod $d$, in order to enable the operator to have one hand free to hold the work while turning up on the screw $d$ with the other.

Now, having described the arrangement of the several parts, I will proceed to describe the operation, which is as follows: Suppose it is required to turn off an arbor or pivot belonging to a watch, first turn back the screw $d$, thereby drawing back the conical collar $c$ and allowing the front points, 1 2 3, of the jaws to open. Now, loosen the screw $m$, thus allowing the center $i$ to yield to any pressure on its end, and to be thrown out again by the spiral spring K when said pressure is removed. To insert the piece of work above mentioned, place the point of one arbor in the countersink in the center $i$ and press in said center until the points 1 2 3 of the jaws $a$ $a'$ $a''$ will take hold of the work at some suitable point without injury to it, then tighten the screw $m$ to confine the center $i$. Next turn up on the screw-rod $d$, which presses the conical collar $c$ against the points of the screws $g$ $g'$ $g''$, and consequently closes the points 1 2 3 on to the work.

Now, I claim the advantages of my invention to be as follows: First, the form of the collar $c$ renders it possible to make it very nearly perfect, as it can be turned on an arbor, and consequently the conical surface made exactly concentric with the hole through its center, which can, of course, be made to fit the spindle E. Therefore, so far, all can be made practically perfect. Now, the screws $g\ g'\ g''$ can be fitted by hand so as to give perfect results when screwed entirely down, and then the index-marks can be made on the heads so that they will be perfect. Now, in holding any large disk in a clutch or chuck it is impossible to hold it exactly square by the circumference alone, and if it has a projecting arbor it can not readily be brought up to a face-plate. Now, in such a case, the arbor is pressed against the center $i$, which yields to the pressure until the work is in a suitable position to be held by the jaws $a\ a'\ a''$; also, in case of a piece of work—such as a pinion—having two arbors and an intermediate portion larger than the arbors, but which is not suitable to be clutched by the jaws of a chuck, as in case of the teeth of the pinion, then the peculiar form of the jaws $a\ a'\ a'$ allows them to reach over such portion and clutch the arbor beyond. Thus I claim two advantages in my invention—first, the manner of construction, whereby it is rendered possible to attain great accuracy in manufacturing; and, secondly, its convenience for general use when completed.

Now, having fully described the construction and operation of my invention, I do not claim the jaws $a\ a'\ a''$ independently or in combination with the conical collar $c$ when used independently of the other parts of my invention or for other purposes than that specified in my description; but What I do claim as new, and desire to secure by Letters Patent, is—

The adjustable center $i$, in combination with the jaws $a\ a'\ a''$ and set-screw $m$, when used for the purpose and in the manner herein described, and forming a part of a chuck for a turning-lathe.

FOLBERT KIRST.

Witnesses:
MILTON BRADLEY,
J. B. GARDINER.